United States Patent [19]
Cramer et al.

[11] Patent Number: 5,390,316
[45] Date of Patent: Feb. 14, 1995

[54] MULTICOMPUTER COMPLEX HAVING A DISTRIBUTED SHARED MEMORY SYSTEM FOR PROVIDING A SINGLE SYSTEM VIEW FROM MULTIPLE CONSOLES

[75] Inventors: Lorraine Cramer, Vestal; Scott A. Fagen, Poughkeepsie; John T. Gates, Jr., Poughkeepsie; Jon K. Johnson, Poughkeepsie; John P. S. Kong, Wappingers Falls, all of N.Y.; Ramu Mohan, Hagerstown, Md.; Christopher P. Vignola, Port Jervis, N.Y.

[73] Assignee: International Business Machines Corporation, Armonk, N.Y.

[21] Appl. No.: 100,639

[22] Filed: Jul. 30, 1993

Related U.S. Application Data

[63] Continuation of Ser. No. 577,189, Aug. 31, 1990, abandoned.

[51] Int. Cl.6 .............................................. G06F 13/00
[52] U.S. Cl. ............................. 395/425; 364/DIG. 1; 364/228.1; 364/228.8; 364/228.9; 364/229.1
[58] Field of Search ............................. 395/400, 425; 364/200 MS File, 900 MS File

[56] References Cited

U.S. PATENT DOCUMENTS

| | | | |
|---|---|---|---|
| 4,060,849 | 11/1977 | Bienvenu et al. | 364/200 |
| 4,399,504 | 8/1983 | Obermarck et al. | 395/650 |
| 4,400,775 | 8/1983 | Nozaki et al. | 395/200 |
| 4,414,620 | 11/1983 | Tauchimoto et al. | 395/200 |
| 4,493,021 | 1/1985 | Agrawal et al. | 395/200 |
| 4,720,784 | 1/1988 | Radhakrishnan et al. | 395/325 |
| 4,887,075 | 12/1989 | Hirasawa | 340/825.03 |
| 4,933,836 | 6/1990 | Tulpule et al. | 395/800 |
| 4,968,977 | 11/1990 | Chinnaswamy et al. | 340/825.8 |
| 4,975,834 | 12/1990 | Xu et al. | 395/800 |
| 4,980,818 | 12/1990 | Shinmura | 395/425 |
| 4,984,153 | 1/1991 | Kregness et al. | 395/425 |
| 5,041,966 | 8/1991 | Nakai et al. | 395/550 |

FOREIGN PATENT DOCUMENTS

| | | |
|---|---|---|
| 0325079 | 1/1988 | European Pat. Off. |
| 0371377 | 11/1989 | European Pat. Off. |

*Primary Examiner*—Joseph L. Dixon
*Assistant Examiner*—Hiep T. Nguyen
*Attorney, Agent, or Firm*—Lawrence D. Cutter

[57] ABSTRACT

A computer complex is provided with a mechanism for message delivery and redelivery in a controlled manner through the use of distributed shared memory. This provides a mechanism for overall computer system complex operation from a plurality of consoles which are registered or identified to the system and which particularly enhances capabilities for remote operation. In this way the complex can be made to look like a single system. Direct communication between any pair of systems is provided, say, by channel-to-channel adapters. Message information is maintained in each system which can also communicate with shared storage to establish update level information regarding locally maintained message information.

10 Claims, 9 Drawing Sheets

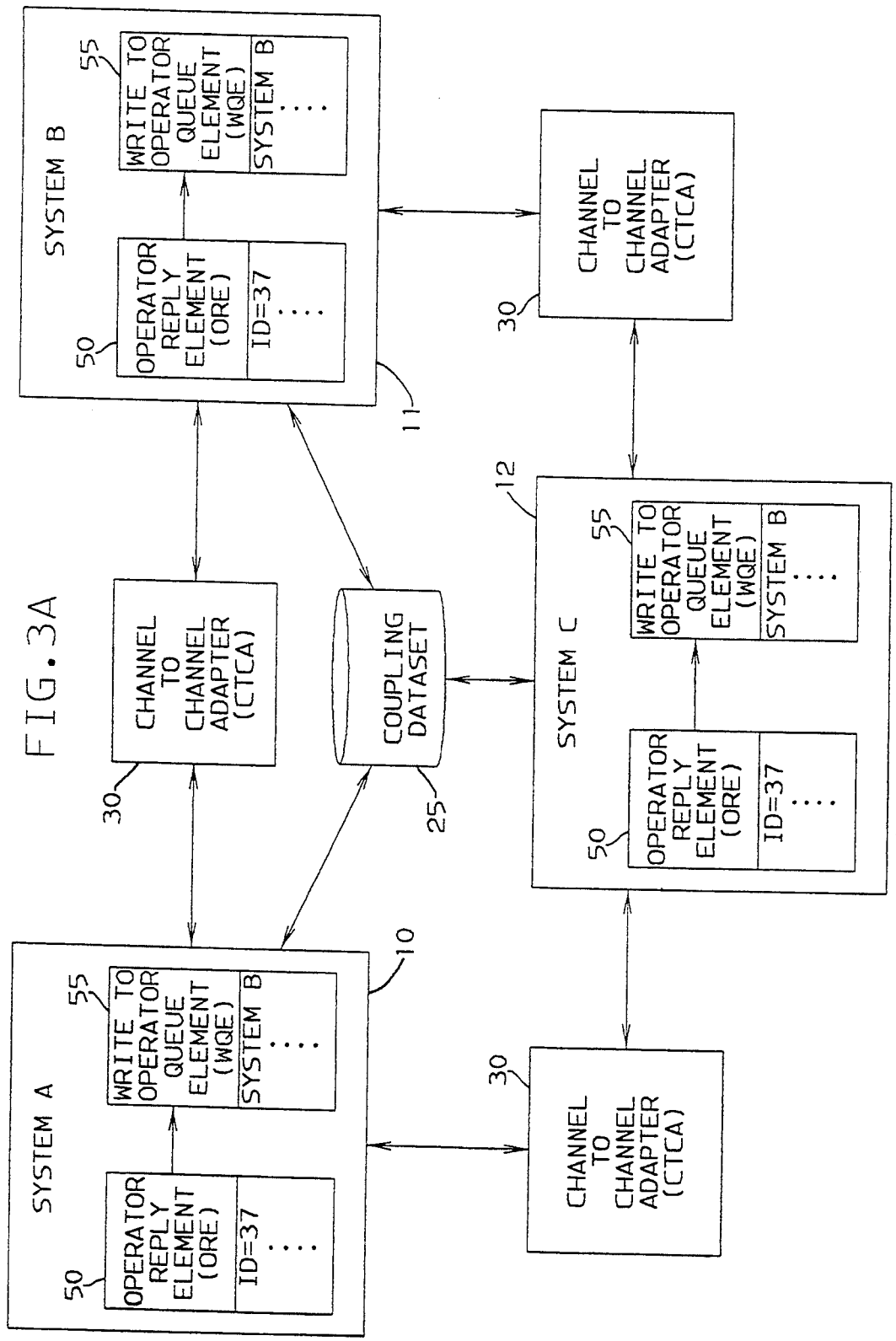

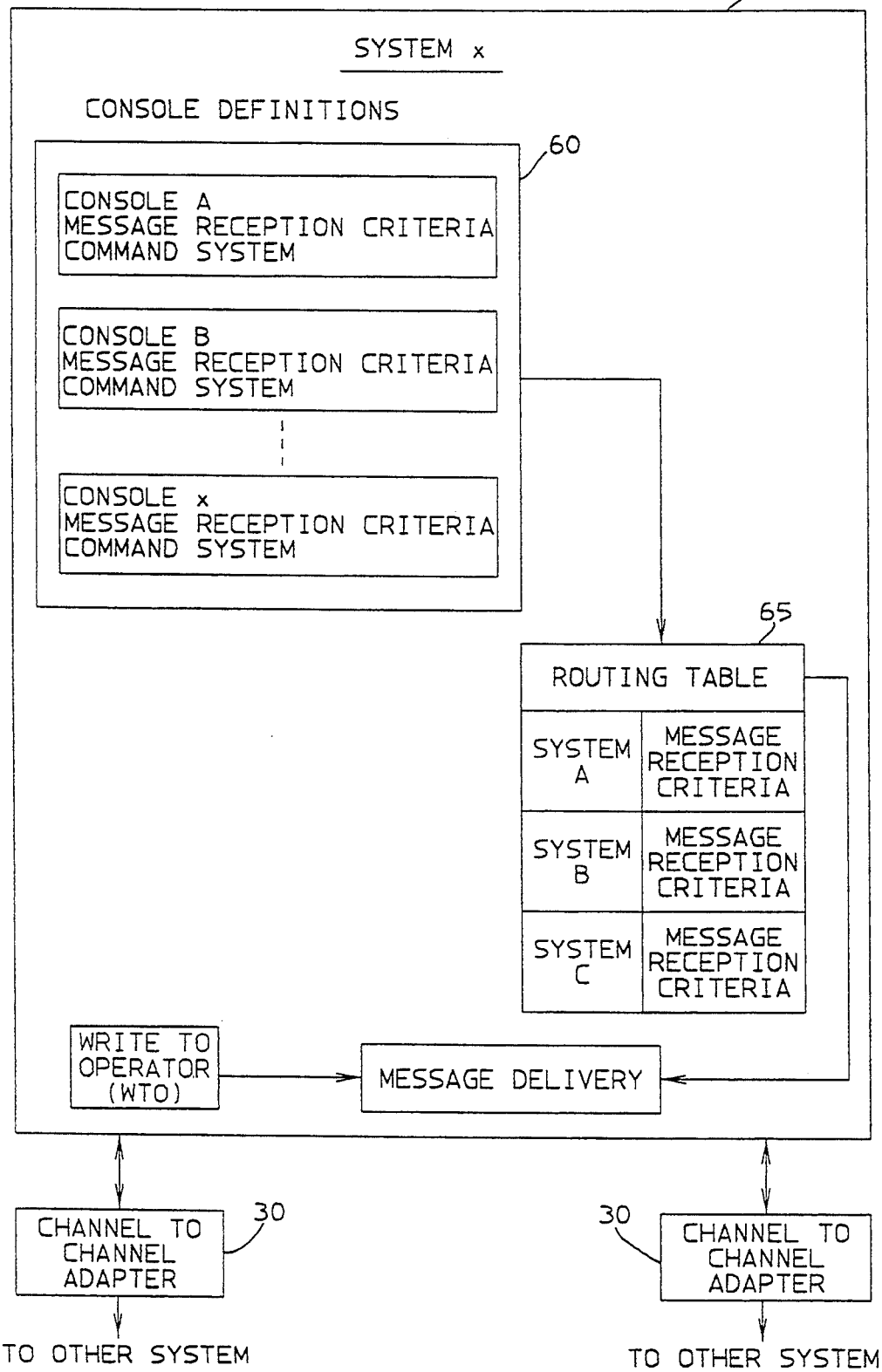

MULTICOMPUTER COMPLEX HAVING A DISTRIBUTED SHARED MEMORY SYSTEM FOR PROVIDING A SINGLE SYSTEM VIEW FROM MULTIPLE CONSOLES

This a continuation of U.S. patent application(s) Ser. No. 07/577,189, filed on Aug. 31, 1990, now abandoned.

BACKGROUND OF THE INVENTION

The present invention is generally directed to the operation and configuration of computer system consoles in a multicomputer complex. Additionally, in support of console message services, the present invention also includes a distributed shared memory structure which permits "multiple read/multiple write" (MRMW) operation protocols.

To more fully appreciate the present invention, it is appropriate to have an understanding of the environment in which it functions. In particular, the environment is most readily considered to be a multicomputer environment which is loosely coupled by means of a shared memory unit which typically comprises a direct access storage device (DASD). Additionally, it is contemplated that the present invention operates in an environment in which the computers in the complex are also connected together and are able to transmit and receive data separately via physical links which are typically represented herein as channel to channel adapters (CTCAs).

As indicated above, there are two aspects of the present invention. The first aspect involves a distributed shared memory discipline and structure which permits multiple read and multiple write operation protocols across a multicomputer complex. This aspect of applicants' invention is generic and is not limited by the environment described immediately above. However, in another aspect of the present invention, applicants have employed a distributed shared memory system structure in the context of providing improved console communications between computer systems in a multicomputer complex.

A key problem addressed by the present applicants is the simultaneous access and sharing of data among a plurality of users in a computer system complex. In particular, users, through their user written applications, often wish to have access to the same set of data at the same time. This includes the necessity and/or desire to be able to read the data and to write to the same data set (file). Implementation of distributed shared memory systems and structures often follows two diverse constructs. In one construct data migration is employed. In this schema, data is "owned" by only one user at a time and either the data itself or "ownership" of the data is passed from user to user or system to system. In the other construct, data replication is employed. That is to say, multiple copies of the data are maintained and each local user is permitted to read and write to the data set via utilization of a central sequencing mechanism to ensure data consistency. This sequencing (or queueing) is necessary if one wants to ensure that all write operations to the data have been done before read operations are undertaken so that users accessing of the data have the most recent information available. One major aspect of the present invention, is that each system or user in the complex has the immediate authority to write to replicated data set without the necessity of employing a distributed server system. In particular, in order to achieve this functionality, the present invention employs a peer-to-peer communication protocol rather than a master/slave protocol system.

In the other aspect of the invention, a distributed shared memory mechanism is applied to system operator console functioning as a mechanism for the transmission of messages to selected console devices. In this context, a message transmitter may be a computer operator working at a specific system complex control console. The message sender may in fact be a user or equivalently a user written application running in one of the address spaces on one of the computer systems in the complex.

In prior systems, it was difficult to manage the whole system from a single one or even a common set of system operator consoles. However, by a judicious application of a distributed shared memory system, it is now possible for messages generated on any computer system in the complex to be viewable by any other console in the complex. Moreover, operating system commands may be directed to any system in the complex. Furthermore, it is possible to provide unique identification for commands which send messages to the computer operator even though the commands to do so are generated on different systems in the complex. This enables a reply command to be issued from any system to answer the specific "Write To Operator with Reply" (WTOR) command. Additionally, message redirection, via either specific commands or events, is carried out by sending updates to the messages instead of transmitting or retransmitting the messages themselves around the computer complex. This provides significant efficiencies. As a result, each system has a common view of operating system services as a result of control by a system of control blocks that are distributed and maintained in a distributed shared fashion across the computer complex.

SUMMARY OF THE INVENTION

In one embodiment of the present invention, a loosely coupled computer system complex which is operable from a number of console devices comprises a number of computer systems each of which possesses internal memory storage and processing elements. Furthermore, channel means for transferring message signals between the computer systems is employed. Shared memory means external to the computer systems permits the storing of message state information in such a fashion so as to be accessible to all of the computers in the complex. Means are provided for associating unique identifying label information with messages generated at the console devices or within the computer systems themselves by user applications which are running on the systems. These messages are transmitted to the same or to another of the computer systems and displayed on a usually different console device. Means are provided for serializing access to the message state information so as to assure consistency of information contained within control blocks within the internal storage of at least two of the computer systems.

In accordance with another embodiment of the present invention, a distributed shared data memory system is used in conjunction with a method for operating a digital computer. In particular, applicants' invention employs a distributed shared memory system based upon replication and furthermore permits multi-write and multi-read system protocols. Multi-reader functionality is accomplished through access to a local copy of specified data using system level block locks and the use of a shared data level indicating mechanism. The multi-writer aspect of the protocol is utilized through the shared external memory system using a serialization method to ensure data consistency.

Accordingly, it is an object of the present invention to provide a distributed or virtual shared memory construct based upon replication of data.

It is likewise an object of the present invention to provide a multi-write and multi-reader protocol for a distributed shared memory system without the necessity of processing operations being carried out through a distributed server system.

It is yet another object of the present invention to provide peer-to-peer based protocol services between multiple consoles in a computer system complex.

It is a still further object of the present invention to provide appropriate console services between computer systems in a multicomputer complex and furthermore to provide them in such a way as to be able to associate system responses with specific messages or commands that have been sent.

It is also an object of the present invention to provide viewability of messages generated on any system in the complex on any other selectable console in the complex.

Lastly, but not limited hereto, it is an object of the present invention to provide message redirection via commands or events, this being accomplished by the transmission of updates to the message or message state without the necessity of sending further messages between computer processors in the complex.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 3A is a functional block diagram illustrating the environment in which the present invention is employed together with certain control blocks employed in conjunction therewith;

FIG. 3B is a functional block diagram illustrating one of the systems shown in FIG. 3A together with other specific control blocks employed therein in support of the present invention;

DETAILED DESCRIPTION OF THE INVENTION

Figure 1:
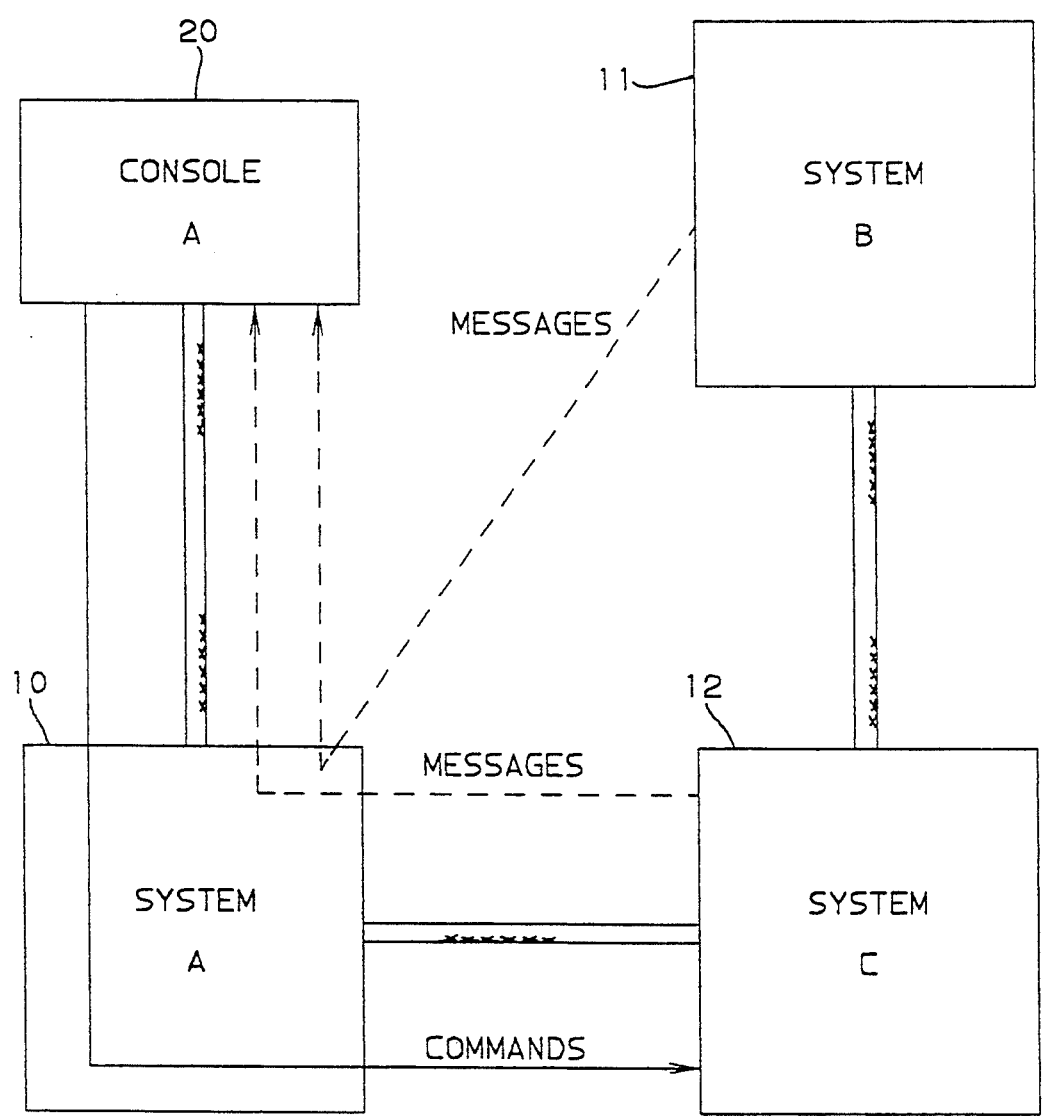
FIG. 1 is a functional block diagram illustrating the logical and physical connection between systems and consoles for the receipt and delivery of commands and messages.

The distributed shared memory structures of the present invention have been particularly implemented for the purpose of enhancing console communications and message passing amongst a plurality of computer system consoles. The computer systems generally referred to herein have the characteristic that they do not share memory among themselves except for an external data set to which all of the computer systems have access. The existence of such a memory would not however preclude the successful operation of the invention herein. However, it is noted that each of the computer systems among the plurality of systems may in fact comprise multi-processor devices which do themselves share memory amongst the multi-processors. Additionally, it is generally understood herein that the computer systems referred to above generally have the capability of transmitting messages directly to one another. This message communication is typically carried out by means of channel-to-channel adapters (CTCA's) that exist to provide a hardware interconnection between computer systems. In such a computer complex, consoles including screens and keyboards may be physically attached to any processor in the configuration. Each computer system or processor may have one or more consoles attached to it and additionally there may be processors in the complex of systems which do not have consoles attached to them.

In one of the aspects of the present invention, a console may elect to receive message traffic generated by one, several or all of the computer systems in the complex. Accordingly, the present invention provides the capability for a console to register or to subscribe itself to act as a console for the receipt of certain classes of messages in the system. Thus, consoles are not limited to being physically connected to any particular computer system in the complex. The registration process for a console allows the console to be established dynamically, after which the console is thus considered to possess a persistent logical connection to any system in the complex and also enables it to operate as the source for command issuance and the target for message delivery. This aspect of applicants' invention is accomplished through the utilization of data stored in virtual shared memory. These data include console group information and attribute information relative to the console. The persistent logical connection is established either by command or by specification of a CONSOLxx file which may for example be contained in an operating system file which has traditionally been referred to as SYS1.PARMLIB which allows an installation to define the configuration and interconnection of its locally attached consoles. Thus, in the present invention it is possible to have the same logical console defined to more than one physical system. The logical console will be active on only one system at a time. The consoles function in the same manner regardless of which physical device on which the console is active.

FIG. 1 illustrates in broad overview form the logical and physical connections that can exist between computer systems A through C (10 through 12) as a result of the implementation of the present invention. In particular, it is seen that console A (reference numeral 20) is physically attached to system A. Its keyboard is logically attached to system C for the transmission of commands and its screen is logically attached to systems B and C. Additionally, it is noted that compatibility with single system operation is achieved by assigning logical keyboard and screen attachment of console A to system A. This is accomplished by means of the above mentioned registration or subscription process which establishes a group data set listing various members and is stored in virtual shared storage as described above.

One of the aspects of the present invention is that in a computer system complex, the redirection of system messages to various consoles within the system in a consistent fashion is a problem which is addressed by means of distributed shared memory structures and methods. In particular, one of the principle advantages of the present invention is the avoidance of message duplication which is eliminated by the sending and processing of updates to global data instead of retransmission and reception of the messages themselves. Accordingly, each computer system in the complex preferably possesses one copy of all of the redirectable messages in their respective holding areas. Thus, redirectable messages become global data and are found in distributed shared memory structures. This transmission of messages amongst a complex of computer systems is a normal function of message processing. However, when a message needs to be redirected or redelivered to another system within the complex, it now becomes possible to do this without resending the message. This is both speedy and efficient and ultimately provides for heretofore otherwise unattainable flexibility and advantages in terms of message dissemination and treatment.

Figure 2:
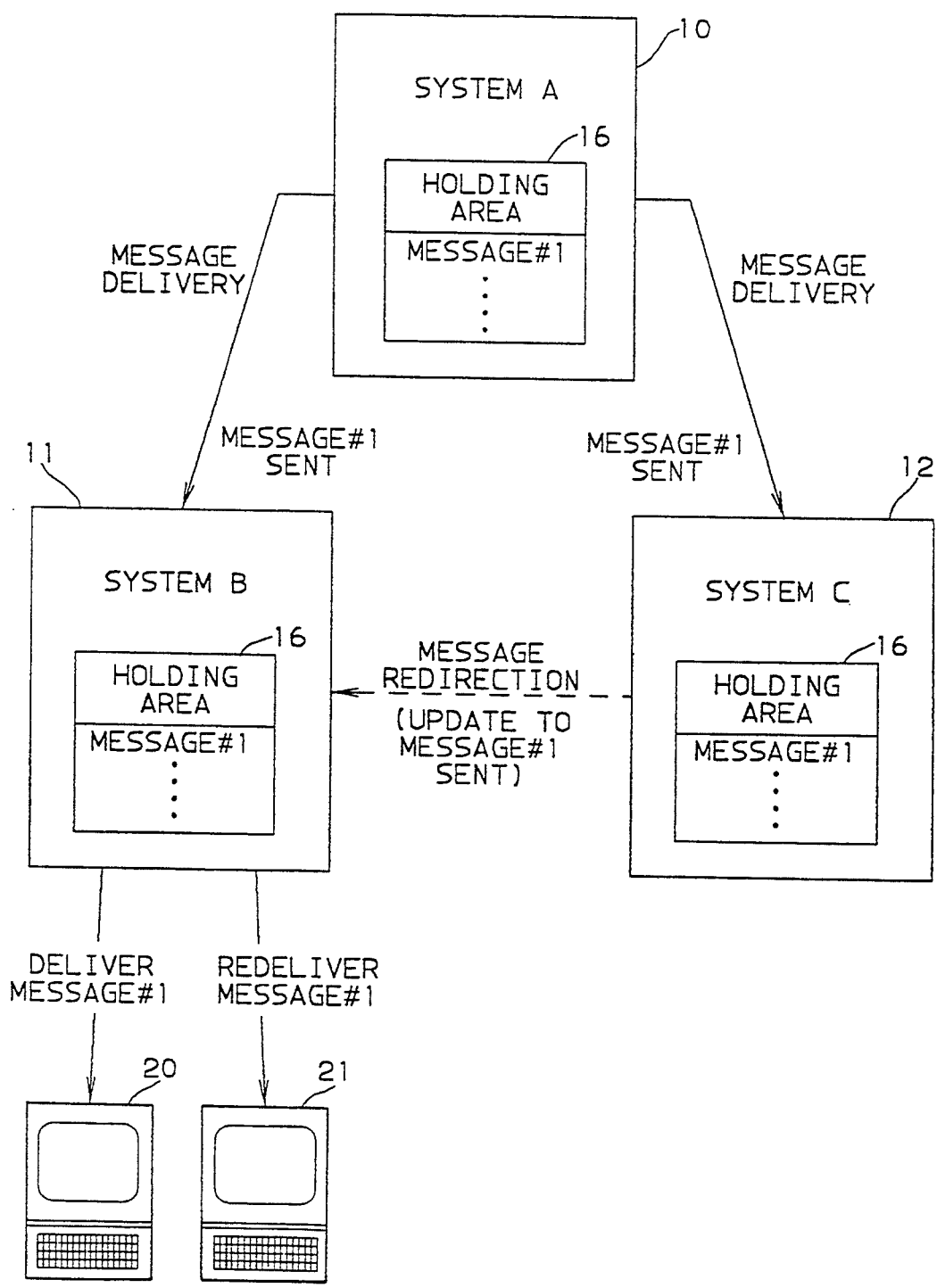
FIG. 2 is a functional block diagram illustrating the message path in a three computer complex.

The overall process is illustrated in FIG. 2 for a computer complex having three systems: system A, system B and system C. While the examples presented herein are provided for the situation in which there are three computer systems in the complex, it should be appreciated that the computer complex may in fact comprise a large plurality of separate computer systems connected in many different configuration and operating in what is generally referred to as a loosely coupled environment.

More particularly, it is seen in FIG. 2 that each system 10-12 includes a holding area 16 for containing messages. Message #1 is shown as being present in the holding areas of each system. This reflects the global aspect of the distributed shared memory construct of the present invention and is thus seen to digress from anything that may be referred to as a data passing model for distributed shared memory systems. The present invention is thus instead seen to follow a replication model.

Further considering the flow of information shown in FIG. 2, it is seen that when message #1 needs to be redirected or redelivered to system B from system C, all that is sent to system B is an update to the message. System B applies the updates to the one copy of message #1, which resides in its holding area, and delivers that updated message to the target console or consoles (20,21) specified by the update. Once message #1 has been delivered to the target or targets, it is put back in the system's holding area to allow further message redirection updates to be made to it. One of the aspects of the present invention that should be appreciated is that the expression "update to the message" generally refers herein to a change in message parameters such as whether or not it ought to be redistributed, to what consoles, by what routes and at what severity level or in what sequence. However, in a broader context, it should generally be appreciated that the term "message update" does in fact refer to a variation in textual information that can occur in relevant contexts other than the operator system console control aspects of the present invention. It is thus seen that an important aspect of the present invention is the application of shared data memory or distributed shared memory concepts to the problem of operator console operation and message servicing.

It should also be appreciated that with respect to the aspects of the present invention relating to interconsole communication in a computer complex, there are four kinds of messages that are here considered to be present. A first kind of message is the conventional text message. A second kind of message is a command which typically instructs the operating system on one of the computers in the complex to perform a specified function. A third kind of message is referred to as a DOM (delete operator message). To be DOMed means that an explicit request has been made to delete a message. This usually occurs after a problem indicated by the message has been resolved. A fourth kind of message circulating amongst the computer systems in a computer complex, is the message update referred to above. It is these latter kinds of messages that are used herein to take full advantage of distributed shared memory constructs. It is important to realize that this difference in applicants' invention is advantageous since it provides a mechanism by which relatively small amounts of data are used to control the transmission of more complicated data structures.

It is noted that in the processes of the present invention, the console is able to be assigned certain characteristics or attributes. In particular, one of the attributes that may be assigned to a console is the so-called "UD" attribute indicating that all important messages for which no eligible recepient was available at the time of delivery will be delivered to this particular console. Furthermore, certain attributes may be set up to permit redistribution of messages and commands to other consoles in the complex.

In the present invention, some of the message traffic in which the system complex communicates with the system operators is generated by means of an operating system macro referred to as "WTOR" which stands for "Write To Operator with Reply". Thus, in order to distinguish the responses to the WTOR's in a computer system complex, it is necessary to assign unique and appropriate identification labels to the messages. This is accomplished through a coupling data set which resides on an external memory device, such as is shown in FIG. 3A. The allocation of this identifying label is managed through the use of a cross system coupling facility (XCF) program which provides locking and serialization access to at least some of the data contents in the coupling data set. In particular, the coupling data set maintains the state of all of the outstanding WTOR responses and messages that exist in the computer complex and the value of the most recent identification label assigned to them. Through the use of a compare and swap service serialization is maintained with respect to relevant aspects of the coupling data set even during a disruption of one of the computers in the system complex. While the serialization of certain aspects of the coupling data set is carried out in the present invention by means of the cross coupling facility, any convenient mechanism for providing locking, appropriate access, and unlocking is usable in conjunction with the data stored on the external memory device.

In each system of the complex, in addition to the message holding areas shown in FIG. 2, there are also present two control blocks which are associated with an issuance of the WTOR command. These two control blocks govern reply processing. This reply processing is typically carried out by means of an operating system macro command, which in this case is appropriately named "REPLY". The WTOR macro and REPLY command have been employed in particular in prior versions of the MVS Operating System. More particularly, the two control blocks referred to above are the "Write to operator Queue Element" (WQE) control block 51 and the "Operator Reply Element" (ORE) control block 50. These blocks are illustrated in FIG. 3A. In the computer complex, when a WTOR macro is issued, for example by an application running on one of the computers in one of the systems. The control blocks are automatically packaged and sent to all other systems for processing. This data transmission is carried out by means of the channel-to-channel adapter units 30 shown in FIG. 3A. In the computer complex, when a WTOR command is issued, a copy of these control blocks is transmitted to each system. Within the operator reply element block, there is included an indication of whether or not the WTOR command was issued on the local system. The WQE block contains the system name of origin.

When processing a REPLY command in the computer complex, the WTOR message is checked to see if it was issued locally. The command is automatically packaged and sent to the system that issued the WTOR, where the command is processed. Upon completion of REPLY processing, the message is removed from the complex by means of the DOM macro (Delete Operator Message). The system that issued the WTOR macro thereafter marks the identifying label on the coupling data set (for example, ID=37 in FIG. 3A) as being available, thus allowing it to be reused by a subsequent WTOR macro issuer. The delete operator message is thereafter propagated to all of the other systems via the CTCA's in the complex to remove the WQE and ORE elements that were associated with the message.

This process flow is shown in FIG. 3A. In the example illustrated, a WTOR macro was issued on system B. A REPLY identification label "37" was obtained through services supporting the coupling data set so as to uniquely identify the message to the complex. Through utilization of the mechanisms and control blocks of the present invention, any subscribed or registered console on any of the systems in the complex can reply to this particular WTOR command by issuing a command of the form "REPLY 37,answertext".

If the responding console is locally attached to system B, then the command is processed locally. The message is deleted (DOMed) on system B and REPLY identification label "37" is marked as being available. The delete command is also sent to system A and to system C in order to remove the WQE and ORE elements for this message on the other systems. This communication is sent via the channel-to-channel adapters attached to various systems in the complex.

If the responding console is however attached to system A or system C, then the command is transported to system B where the processing described above takes place.

A significant feature of the present invention is that it enables each computer system in the complex to possess a common view of the operator system console configuration by means of distributed control block structures. This method enables each system to maintain a common set of control blocks describing console status information. Changes to this set of transcomplex blocks is managed through a multisystem data serialization and update process separate from that used to control serialized access to a coupling data set. The process is fault tolerant in that all systems in the complex need not be operative at the time that the update is performed. Rather, through an external reference, each system is able to determine independently whether or not it possesses the correct level of data and can acquire a data refresh operation from another system in the event that an incorrect data level is detected. For this reason, shared data level information is stored as part of the coupling data set on the external device. Thus, the present invention involves the effective coordination of distributed shared data representing messages and distributed shared data representing control blocks associated with the message together with controlling state information contained on an external memory device.

In addition to the control blocks illustrated in FIG. 3A, additional control blocks are also employed in conjunction with system console constructs. In particular, FIG. 3B illustrates computer system x (x=A, B or C) which includes routing table 65. For each system in the complex, the Routing Table contains an entry which indicates specified message reception criteria for that particular system. The message criteria preferably include descriptor codes which, for example, serve to provide an indication of message severity (immediacy of response). The message criteria also preferably include routing codes which specify category information classifying the message as belonging to certain services or devices such as a tape pool, printer operations, a master console or a service console. The routing table is linked to a table of console definitions 60 for each of the consoles which may be defined to the system. The Routing Table has entries which contain the aggregate message reception criteria for those consoles which are physically attached to the system in question. The Routing Table therefor preferably contains an entry for each system in the complex. The Routing Tables across these systems are maintained in a consistent state through the use of distributed shared memory method discussed elsewhere herein.

Attention is now more specifically directed to the distributed shared memory aspects of the invention. In particular the distributed or virtual shared memory processes and structures employ the following multisystem capabilities. In particular, the method employs a set of intersystem communications channels. For example, these channels are provided in the form of channel-to-channel adapters as shown in FIG. 3A. Additionally, the method employs multisystem serialization. In particular, the present method employs a facility or service which is provided by the MVS operating system and is referred to as the Global Resource Serialization service (GRS service). While the invention is described herein with particular consideration being given to this serialization service, it is noted that any method for serialization for controlling the sequence of access to information through the utilization of data locks may be employed as long as the serialization is global to the system complex. Additionally, as indicated above, the present method employs an external data storage mechanism, preferably in the form of a DASD memory unit which is accessible to all of the computer systems in the complex. Only a relatively small amount of data needs to be stored on this external medium. In one implementation of the present invention, a significant portion of the system complex state information requires only twelve bytes of data including 8 bytes serving as a unique time (and impliedly a date) stamp and 4 bytes to indicate the shared data level. This externally stored data is referred in the description below (FIGS. 4 through 8) as an "external reference" and in particular, contains shared data level (SDL) indicia which is a stamp that uniquely identifies the current level (freshness) of the virtual shared memory. Another significant portion of externally stored information provides a sequence number for ordering and linking replies and messages, a reply identifier and usage information for outstanding replies.

From an overall perspective, the distributed shared memory processes are particularly important for console message operation in that memory update processes provide the necessary indications to the various systems in the complex concerning the states of various console message reception criteria and how they should be treated. In particular, an important message reception criteria which is affected by the update process is the state indicating whether or not a console is available to receive a particular message.

Thus from the overall perspective, the virtual shared memory update process proceeds as follows. Firstly, a serialized memory access is initiated. In order to carry out the serialized access, a lock on the external data store is acquired. Then, a check is made comparing the local shared data level with the system complex shared data level. If the local memory is indicated as being "down level" or "behind level" in its status as a result of this comparison, then a refresh process is performed. Secondly, in the update process the local memory copy is updated. Thirdly, other computer systems in the complex are then updated. This latter update process is carried out in a sequence of steps. The updated memory contents are first arranged in a package which is then distributed to the other computer systems in the complex. This is done to provide a common format for all data received by the various systems in the complex. Then, a wait period is entered pending either acknowledgement (ACK) of receipt of the package data from all other systems in the complex or a receipt of a message from a timer function indicating that the allotted amount of time for a response has been exceeded. At this point, the updating system issues a commit signal to update the external reference and to notify other members of the computer complex that this has occurred. Fourthly, the serialized access is ended, for example by simply releasing the lock initially acquired.

In the MVS operating system environment, the distributed shared memory method employed herein is implemented using ENQUEUE and DEQUEUE services for serialization and further specifically employs the cross system coupling facility (XCF) group services for intersystem communications through the channel-to-channel adapters.

Figure 4:
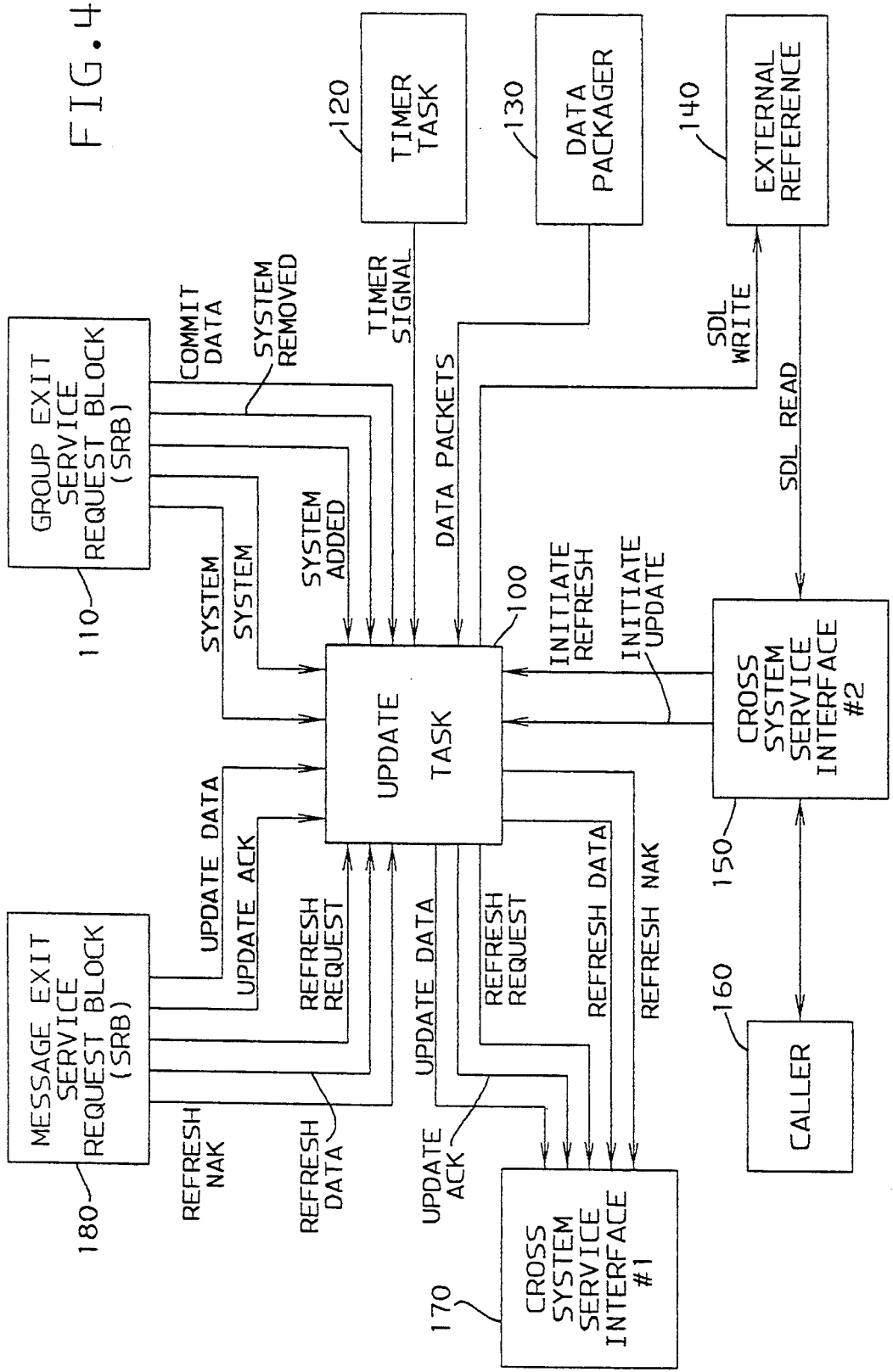
FIG. 4 is a functional block diagram illustrating the overall relationship between tasks, services and interfaces used in establishing the distributed shared memory aspects of the present invention.
Figure 5:
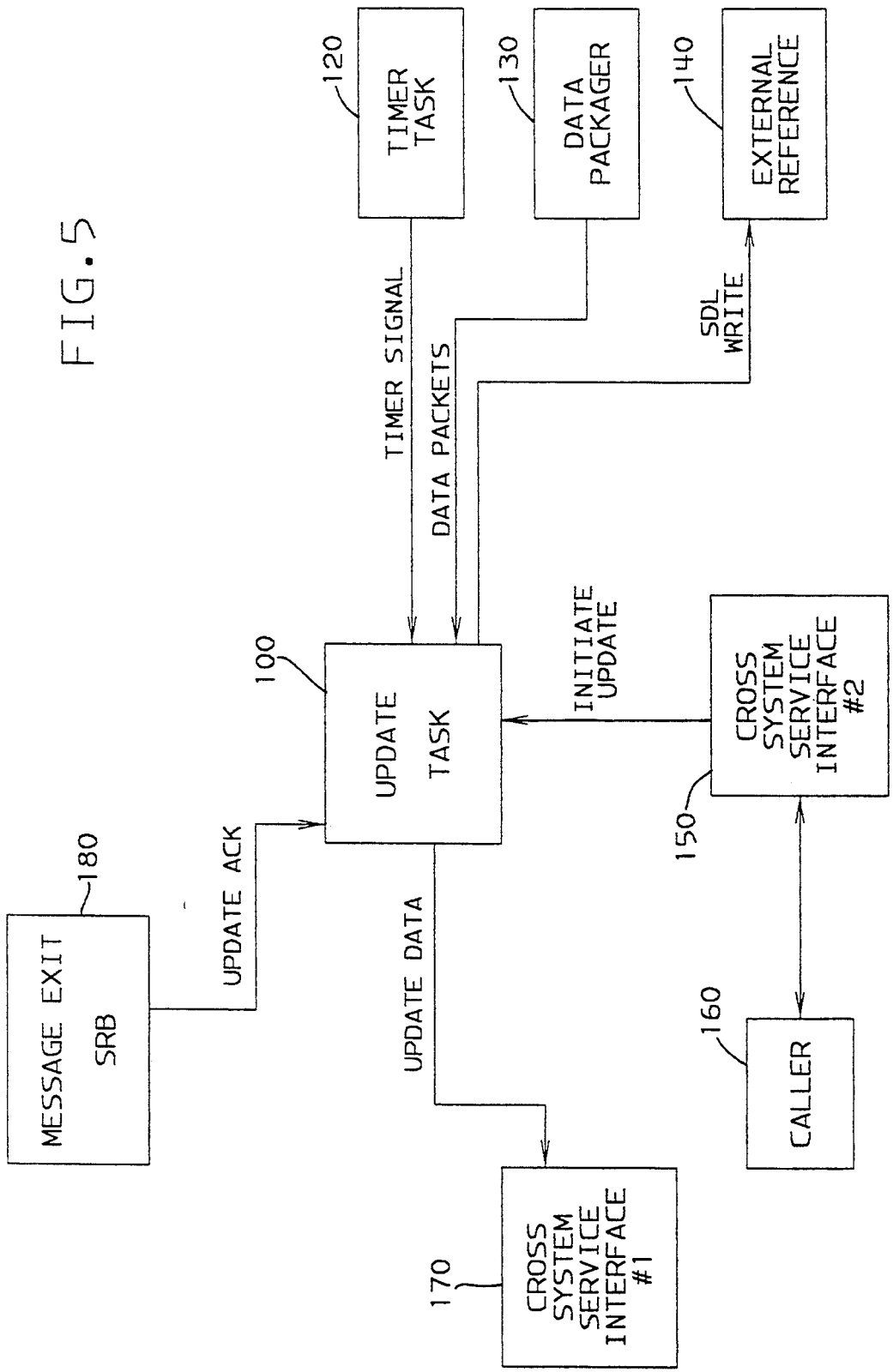
FIG. 5 is a view similar to FIG. 4 but more specifically indicating those particular data flows in a virtual or distributed shared memory system during the occurrence of an update function.

FIG. 4 represents an overview of the internal structure of the tasks, blocks and services that perform the desired functions in association with the specific form of a distributed shared memory structure considered herein. As indicated, FIG. 4 is an overall view indicative of the interrelationship of all the components under all possible conditions. It is provided for the purpose of illustrating the entire set of interrelationships between the tasks, services and blocks. However, for updating, receiving, requesting and responding activities only a certain portion of the structures shown in FIG. 4 are active. These individually active sets of structures are discussed more particularly below in the context of the various activities (updating, receiving, requesting, responding) involved in the method. Thus, a more detailed description of the activities occurring in FIG. 4 is seen below with particular with respect to FIGS. 5 through 8.

However, a general description of the functional blocks shown in FIG. 4 is first provided as a basis for understanding the detail process flow steps shown in FIGS. 5 through 8. In particular, Message Exit Service Request Block 180 is used as a control whenever one system sends a data package to another system via the cross system coupling facility (XCF). Group Exit Service Request Block (SRB) 110 is used as a control whenever an event occurs in a system in the complex (for example, start, stop, add, remove) or when the internal state of a member of the console cross coupling facility group is changed. Cross System Interface #1 (reference numeral 170) is a console service that provides an interface to the cross coupling facility (XCF) intersystem communications services which simply provides a means for direct data transfer. Update Task function block 100 operates as the transaction coordination center for distributed shared memory data activities. Timer Task 120 is a provider of timed interrupts to the update task and functions in the role of providing the timed-out access indications described above. Cross System Service Interface #2 (reference numeral 150) provides distributed shared memory serialization and multisystem update services to other console components in the complex. Data Packager 130 arranges information in an updating system for individual system data that is involved in a distributed shared memory update. External Reference block 148 refers to the coupling data set on external memory unit (DASD) 25 described above. In particular, it is the repository of shared data level refresh (SDL) information. It is implemented as a user field in a cross coupling facility group member in the coupling data set.

Attention is now more particularly directed to the data flows that occur in the distributed shared memory constructs herein in different operating circumstances. These are particularly illustrated in FIGS. 5 through 8, all of which are, in a certain sense, subsets of the overall view shown in FIG. 4. In particular, discussion is first directed to the data flow that occurs in the distributed shared memory system update process operation. In particular, a request for a multisystem update is provided from a caller through Cross System Interface #2. This interface then operates to send an initiate update request to the "Update Task" control coordinator. Subsequently, the Update Task control coordinator receives data packets of updated data from the data packager and then retransmits these data packets to other systems through Cross System Interface #1. Subsequently, through the mediation of the Message Exit SRB an update acknowledgement (ACK) is received from other systems or in fact a time out event might have occurred as a result of signals from the Timer Task. Finally, a commit signal occurs which results in the writing of shared data level information onto the external shared memory unit (DASD typically). Additionally, the local memory influence of the shared data level is correspondingly updated.

Figure 6:
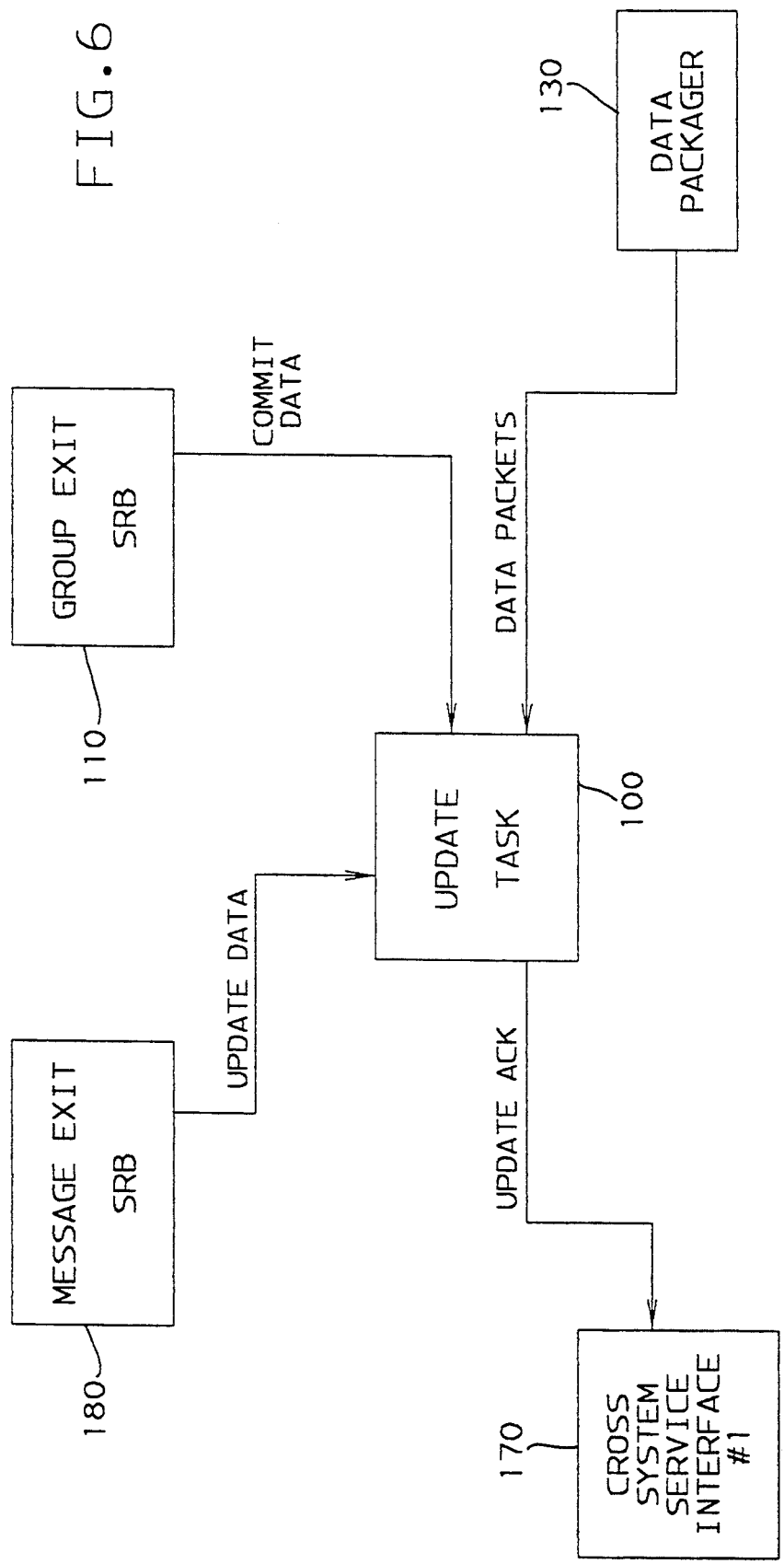
FIG. 6 is a view similar to FIGS. 4 and 5 but more particularly illustrating the data flow occurring in a receiving system.

Next is considered the data flow in FIG. 4 which occurs on a receiving system which utilizes the distributed shared memory structures and methods herein. This particular data flow is illustrated in FIG. 6. In this situation, update data is received from the updating computer system by means of Message Exit SRB. Subsequently, an update acknowledgement (ACK) is sent to the updating system through Cross System Interface #1. Thereafter, a commit signal is received from the updating system through Group Exit SRB. And finally, the update is applied by the update tasks by invoking the Data Packager and transferring data packets thereto. At the same time the local version of the shared data level is updated. This four step updating process is illustrated in FIG. 6.

Figure 7:
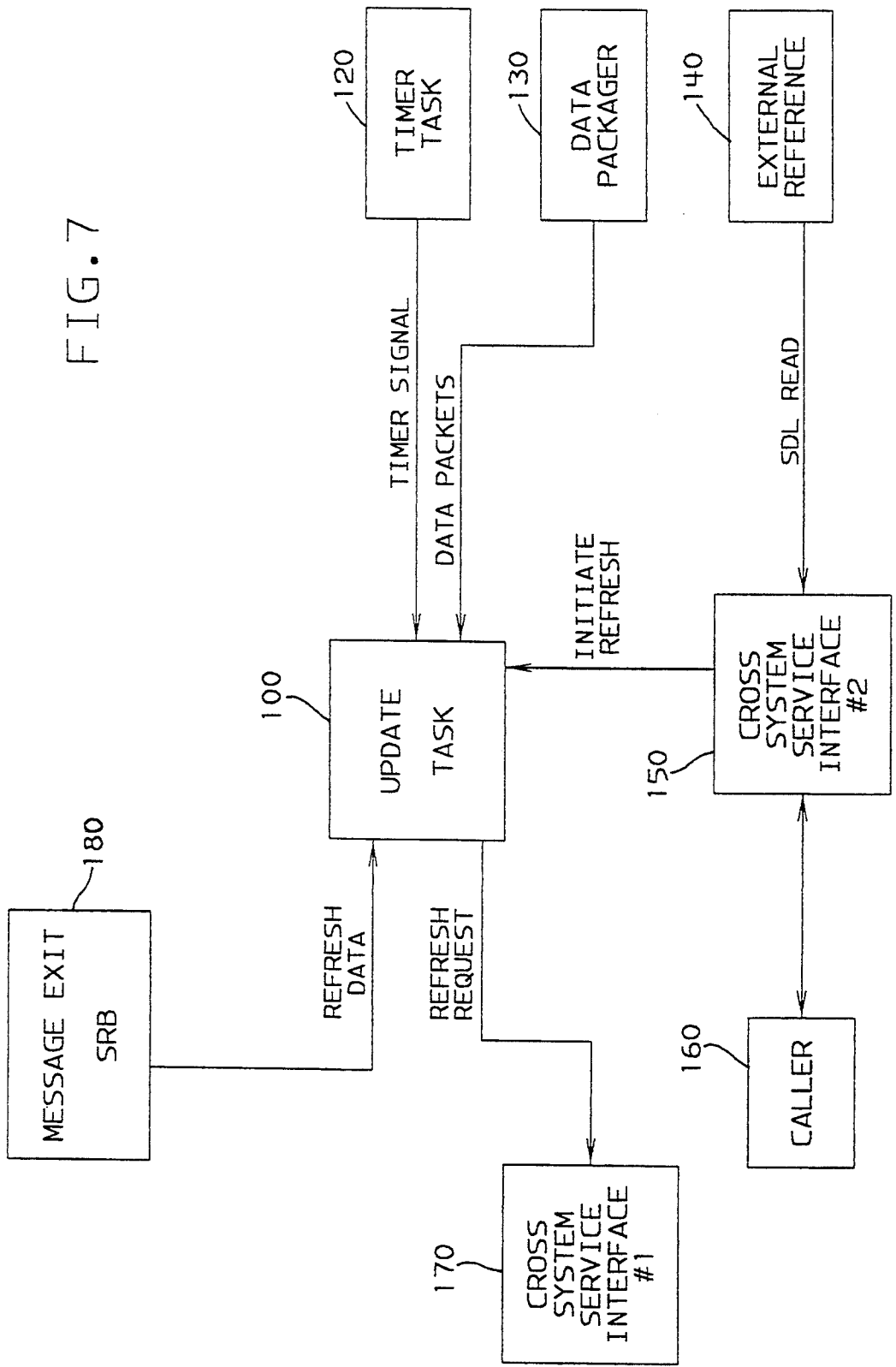
FIG. 7 is a view similar to FIG. 4 but more particularly illustrating the data flow in a requesting system.

Attention is next directed to the data flow through the distributed shared memory system on a requesting system. This data flow is more particularly illustrated in FIG. 7. More particularly, FIG. 7 shows the following steps as occurring on a requesting system. First, a multisystem lock is established for serialization purposes with respect to the external data set. Next, a comparison is made between the internal shared data level (SDL) and the shared data level indicated on the external memory medium. This is accomplished through the Cross System Interface #2 which causes a read operation to be performed prior to the comparison. If the internal shared data level does not match the external shared data level, then Cross System Interface #2 initiates a refresh request to the Update Task coordinator. Following this, the refresh request is sent to the target system through Cross System Interface #1. The target system responds by sending the requested data or by sending a "refresh requested negative acknowledgement (NAK) if it does not possess the requested level of shared data. Note that the NAK contains the current internal shared data level of its sender. The response is received through the facilitation of the Message Exit Service Request Block. If no response is received in due time, a timer interrupt occurs and another system is selected to which a refresh request can be sent. If a NAK is received, then the requesting system must select another system to which the refresh request can be directed. If all the systems have returned NAK's then the shared data levels that are returned in the NAK signal and the requesting system's own internal shared data level are compared. If the requesting system possesses the highest shared data level, then the refresh request is cancelled. If some other system has the highest shared data level, then that shared data level is considered to be the highest shared data level in the complex and the refresh requesting process starts over. If refresh data is received from the target system then data packets with refresh data are transmitted to the Data Packager for unpacking operations. The steps illustrated in FIG. 7 show the process flow which occurs when the target system has responded to the refresh request by sending the requested data.

Figure 8:
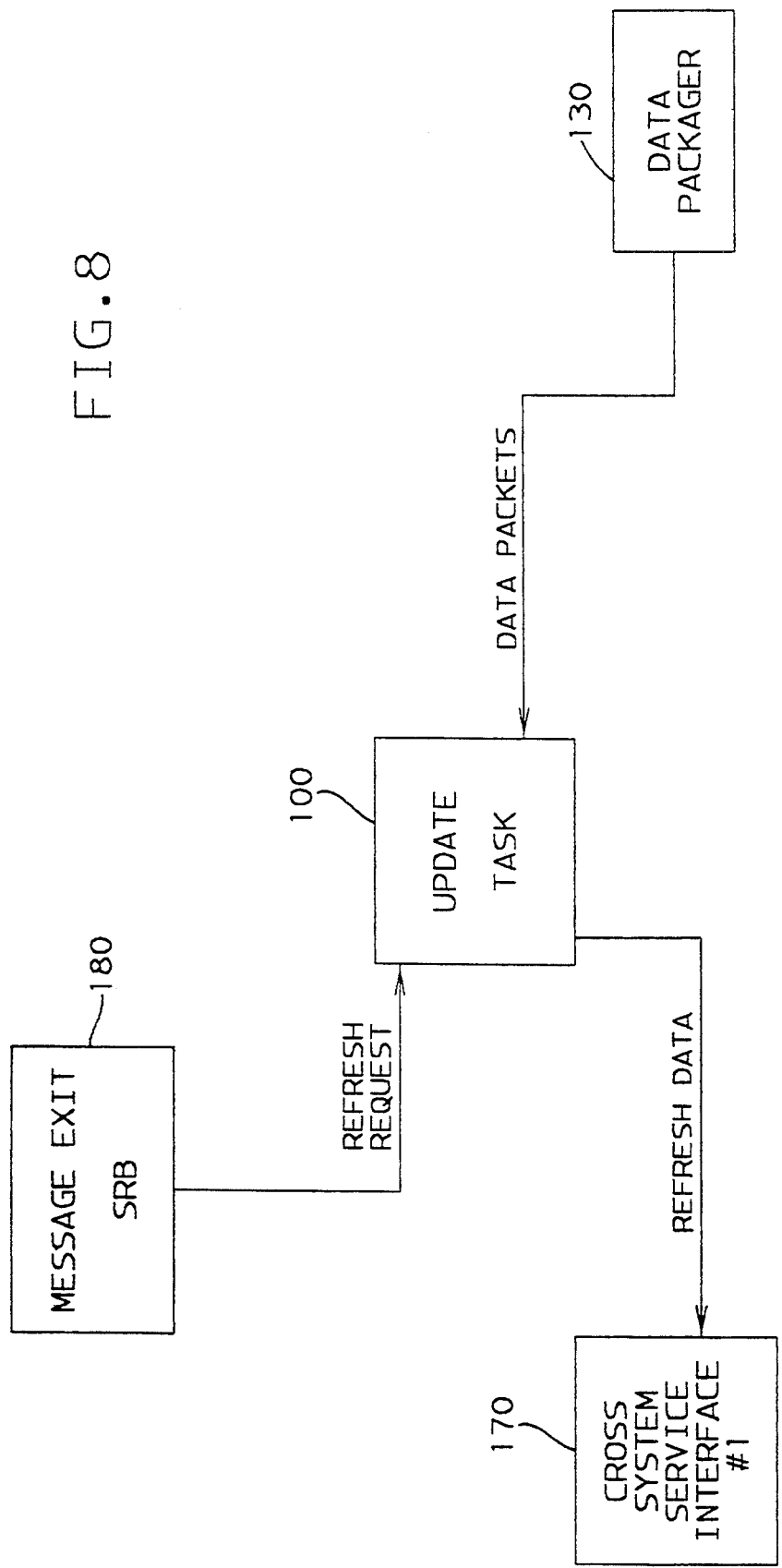
FIG. 8 is also a view similar to FIG. 4 but more particularly illustrating the data flow in a responding system.

Next is considered the data flow through the distributed shared memory structure that occurs on a responding computer system. This is illustrated in FIG. 8. In this case, the following steps occur. In particular, a refresh request is received through the Message Exit SRB by the Update Task coordinator. Next, the internal shared data level is compared against the requested shared data level contained in the refresh request. If the responding system possesses the requested level of data then packaged refresh data is received from the Data Packager. If the responding system does not possess the requested level of data then a negative acknowledgement (NAK) is constructed which contains the internal shared data level of the responding system. Lastly, the response (packaged refresh data or a NAK) is sent back to the requestor.

Thus from the above, it should be appreciated that the methods and apparatus of the present invention provides several advantages not heretofore achieved, especially in multicomputer system complexes. In particular, it is seen that each computer system in the complex possesses both read and write update capabilities for a distributed shared memory. This feature is accomplished through the utilization of distributed control blocks present in one or more of the computer systems. This feature takes advantage of the presence of an external memory device accessible to all of the systems and to communications paths which exist between computer systems through the utilization of channel-to-channel adapters. Additionally, it is also seen that the present method is particularly applicable to the control of message transmission and reception in a multicomputer complex which is designed to be controllable from one or more separate computer consoles attached to any one of the specified computer systems in the complex. Thus, message redelivery is possible without causing message duplication. This is achieved by message display updates rather than sending the message itself. Additionally, human factors improvements associated with the WTOR command have been achieved. In particular, WTOR commands in a multisystem environment can now uniquely be identified by the WTOR ID label rather than by a combination of system name and WTOR label. Finally, logical rather than physical console attachment between a console and a system in the complex is established. The message delivery and command navigation options enable a console to be physically attached to one system, but behave as though it was attached to another. This provides great console configuration flexibility thereby opening up the possibility of numerous operating domains.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A computer system complex operable from a plurality of consoles, said computer system complex comprising:

a plurality of computer systems, each possessing means for storing redirectable message signals;

channel means linking said computer systems for transferring message signals between computer systems for within said computer system complex;

shared storage means, accessible by said computer systems, for storing system complex wide state information;

means for associating system complex wide unique identification information with said message signals which are generated within said computer systems for display at consoles attached thereto, said message signals being for transmission to the same or another of said computer systems, said system complex wide unique identification information being part of said system complex state information; and means for serializing access to said system complex wide state information to assure consistency of information contained within control blocks within the internal storage of at least two of said computer systems.

2. The computer system complex of claim 1 in which said channel means comprises channel-to-channel adapters.

3. The computer system complex of claim 1 in which said system complex state information includes message sequence data, 4. The computer system complex of claim 1 in which said system complex state information includes said unique identification information, 5. The computer system complex of claim 4 in which said unique identification information comprises a message sequence number, 6. The computer system complex of claim 1 in which said shared memory means comprises at least one direct access storage device, 7. The computer system complex of claim 1 further including means, residing within at least one of said computer systems, for redirection of said message signals to other computer systems available for its receipt.

8. The computer system complex of claim 7 in which said message signals include an update status indication.

9. The computer system complex of claim 1 further including means residing within at least one of said computer systems, for determining which message signals are delivered to at least one of said consoles.

10. A method for operating a computer system complex having a plurality of separate computer systems and having channel means for direct communication between at least two of said computer systems and also having shared storage means accessible by said computer systems, wherein a plurality of consoles are each respectively coupled to one of said computer systems for the purpose of entering commands and receiving message signals, said method comprising the steps of:

providing serialized access to system complex wide state information stored on said shared storage means;

maintaining consistency of said system complex wide state information by checking local versus system complex wide state information and refreshing both local status information and said system complex wide state information as necessary by acquiring the correct system complex wide state information from another of said computer systems;

transmitting said computer system complex wide state information, through said channel means, from one of said computer systems in said complex to at least one other of said computer systems, said system complex wide state information being updated after said transmission is complete; and updating said locally stored control block structures in response to said system complex wide state information, so as to maintain consistency system complex wide state information.

* * * * *